United States Patent
Yokoyama (10) Patent No.: US 10,792,847 B2
(45) Date of Patent: Oct. 6, 2020

(54) INJECTION MOLDING MACHINE

(71) Applicant: SODICK CO., LTD., Kanagawa (JP)

(72) Inventor: Koichi Yokoyama, Kanagawa (JP)

(73) Assignee: SODICK CO., LTD., Kanagawa (JP)

( * ) Notice: Subject to any disclaimer, the term of this patent is extended or adjusted under 35 U.S.C. 154(b) by 374 days.

(21) Appl. No.: 15/810,142

(22) Filed: Nov. 13, 2017

(65) Prior Publication Data

US 2018/0133940 A1    May 17, 2018

(30) Foreign Application Priority Data

Nov. 15, 2016 (JP) ................................. 2016-222070

(51) Int. Cl.
*B29C 45/04* (2006.01)
*B29C 45/54* (2006.01)
(Continued)

(52) U.S. Cl.
CPC ........ *B29C 45/045* (2013.01); *B29C 45/2737* (2013.01); *B29C 45/53* (2013.01);
(Continued)

(58) Field of Classification Search
CPC ... B29C 45/045; B29C 45/54; B29C 45/2737; B29C 45/56; B29C 45/67; B29C 45/53; B29C 45/82; B29C 45/5008; B29C 45/4208; B29C 45/17; B29C 45/544; B29C 2045/1795
See application file for complete search history.

(56) References Cited

U.S. PATENT DOCUMENTS 3,915,614 A * 10/1975 Farrell et al. ........... B29C 49/06
425/450.1
4,767,306 A * 8/1988 Kawaguchi et al. ... B29C 45/00
(Continued)

FOREIGN PATENT DOCUMENTS

| JP | H0397518 | * 4/1991 | ............. B29C 45/54 |
|---|---|---|---|
| JP | 2007001268 | 1/2007 | |
| JP | 2007125767 | 5/2007 | |
| JP | 2014188939 | 10/2014 | |

OTHER PUBLICATIONS

"English translation of Office Action of Japan Counterpart Application," dated Jun. 6, 2017, pp. 1-4.
(Continued)

*Primary Examiner* — Nahida Sultana
(74) *Attorney, Agent, or Firm* — JCIPRNET (57) ABSTRACT

Provided is an injection molding machine (1) including a plasticizing unit (2), an injection unit (3), a communication path (5a) configured to communicate therebetween and having an opening (5b) on the plasticizing unit side which is located on an axis of the screw (21), and a backflow prevention mechanism part (6) configured to close and open the opening on the plasticizing unit side by advancing and retreating the screw (21) in the axial direction, wherein the backflow prevention mechanism part (6) includes a tapered wedge portion (61) having an inclined surface (61a), a driving portion (63) which moves the wedge portion in the forward and backward directions, and a pressing member which is pressed against the inclined surface (61a) by forward movement of the wedge portion and moves the screw toward the opening on the plasticizing unit side.

14 Claims, 9 Drawing Sheets

(51) Int. Cl.
    *B29C 45/27*       (2006.01)
    *B29C 45/56*       (2006.01)
    *B29C 45/67*       (2006.01)
    *B29C 45/53*       (2006.01)
    *B29C 45/82*       (2006.01)
    *B29C 45/50*       (2006.01)
    *B29C 45/42*       (2006.01)

(52) U.S. Cl.
    CPC .............. *B29C 45/54* (2013.01); *B29C 45/56* (2013.01); *B29C 45/67* (2013.01); *B29C 45/82* (2013.01); *B29C 45/4208* (2013.01); *B29C 45/5008* (2013.01)

(56) References Cited

U.S. PATENT DOCUMENTS

| | | | |
|---|---|---|---|
| 6,461,142 B1* | 10/2002 | Kadoriku ................ | B29C 45/52 |
| | | | 425/558 |
| 2011/0229597 A1* | 9/2011 | Brelski ................... | B29C 45/52 |
| | | | 425/562 |
| 2016/0075065 A1* | 3/2016 | Yokoyama .......... | B29C 45/1775 |
| | | | 425/574 |

OTHER PUBLICATIONS

"English translation of Decision of Refusal of Japan Counterpart Application," dated Aug. 22, 2017, pp. 1-3.
"English translation of Office Action of Japan Counterpart Application," App. No. JP2017-206738, dated Nov. 14, 2017, pp. 1-3.

* cited by examiner

INJECTION MOLDING MACHINE

CROSS-REFERENCE TO RELATED APPLICATION

This application claims the priority benefit of Japan application serial no. 2016-222070, filed on Nov. 15, 2016. The entirety of the above-mentioned patent application is hereby incorporated by reference herein and made a part of this specification.

BACKGROUND OF THE INVENTION

Field of the Invention

The present invention relates to a screw pre-plasticizing injection molding machine in which a plasticizing unit or a mixing unit is separated from an injection unit, and more particularly to a backflow prevention mechanism which prevents a backflow of a molding material from the injection unit to the plasticizing unit or the mixing unit.

Description of Related Art

Patent Document 1 discloses a screw pre-plasticizing injection molding machine which includes a plasticizing unit for plasticizing a molding material with a screw rotating in a plasticization cylinder, an injection unit for injecting the plasticized molding material supplied from the plasticizing unit with a plunger moving back and forth in the injection cylinder, and a communication path for communicating the plasticizing unit and the injection unit. The molding material plasticized by the plasticizing unit passes through the communication path and is supplied to the injection unit. Before the injection unit injects the molding material, the screw advances to close an opening of the communication path on the plasticizing unit side. The molding material does not flow back from the injection unit to the plasticizing unit.

PRIOR ART DOCUMENT

Patent Documents

[Patent Document 1] Japanese Unexamined Patent Application Publication No. H3-97518

SUMMARY OF THE INVENTION

It is necessary for the screw to close the opening of the communication path on the plasticizing unit side with a sufficient thrust force capable of preventing a backflow of the molding material against a large injection pressure acting on the molding material at the time of injection. In Patent Document 1, a hydraulic cylinder is used as a driving device for advancing the screw. The hydraulic cylinder can easily generate a large thrust force. A pneumatic cylinder or an electric actuator which is easy to maintain is desired for the drive device. However, the pneumatic cylinder or the electric actuator which generates the thrust force against a large injection pressure has a large external dimension and weight.

The present invention provides an injection molding machine which is compact and has a mechanism capable of preventing a backflow of a molding material. Additional advantages of the invention will be set forth in the description that follows.

Provided is an injection molding machine 1 of the present invention including a plasticizing unit 2 configured to plasticize a molding material by rotation of a screw 21 in a plasticization cylinder 20, an injection unit 3 configured to meter the plasticized molding material supplied from the plasticizing unit by retreating a plunger 31 in an injection cylinder 30 and then to inject the plasticized molding material by advancing the plunger, a communication path 5a configured to communicate the plasticization cylinder of the plasticizing unit and the injection cylinder of the injection unit and having an opening 5b on a plasticizing unit side which opens into the plasticization cylinder and is located on an axis of the screw 21, and a backflow prevention mechanism 6 configured to open and close the opening on the plasticizing unit side by advancing and retreating the screw in an axial direction in the plasticization cylinder, wherein the backflow prevention mechanism includes a tapered wedge portion 61 which is movable in forward and backward directions, is tapered toward a tip end thereof and has an inclined surface 61a oblique to the forward and backward directions and oblique to the axial direction, a driving portion 63 configured to move the wedge portion in the forward and backward directions, and a pressing member which is disposed to face the inclined surface of the wedge portion and is moved while being pressed against the inclined surface by forward movement of the wedge portion and moves the screw toward the opening on the plasticizing unit side.

Provided is an injection molding machine of the present invention including a mixing unit configured to mix a molding material by rotation of a screw in a mixing cylinder, an injection unit configured to meter the mixed molding material supplied from the mixing unit by retreating a plunger in an injection cylinder and then to inject the plasticized molding material by advancing the plunger, a communication path configured to communicate the mixing cylinder of the mixing unit and the injection cylinder of the injection unit and having an opening on a mixing unit side which opens into the mixing cylinder and is located on an axis of the screw, and a backflow prevention mechanism configured to open and close the opening on the mixing unit side by advancing and retreating the screw in an axial direction in the mixing cylinder, wherein the backflow prevention mechanism includes a tapered wedge portion which is movable in forward and backward directions, is tapered toward a tip end thereof and has an inclined surface oblique to the forward and backward direction and oblique to the axial direction, a driving portion configured to move the wedge portion in the forward and backward directions, and a pressing member which is disposed to face the inclined surface of the wedge portion and is moved while being pressed against the inclined surface by forward movement of the wedge portion and moves the screw toward the opening on the mixing unit side.

According to the injection molding machine of the present invention, even when the driving portion of the backflow prevention mechanism is compact, a backflow of the molding material can be prevented.

DESCRIPTION OF THE EMBODIMENTS

Figure 1:
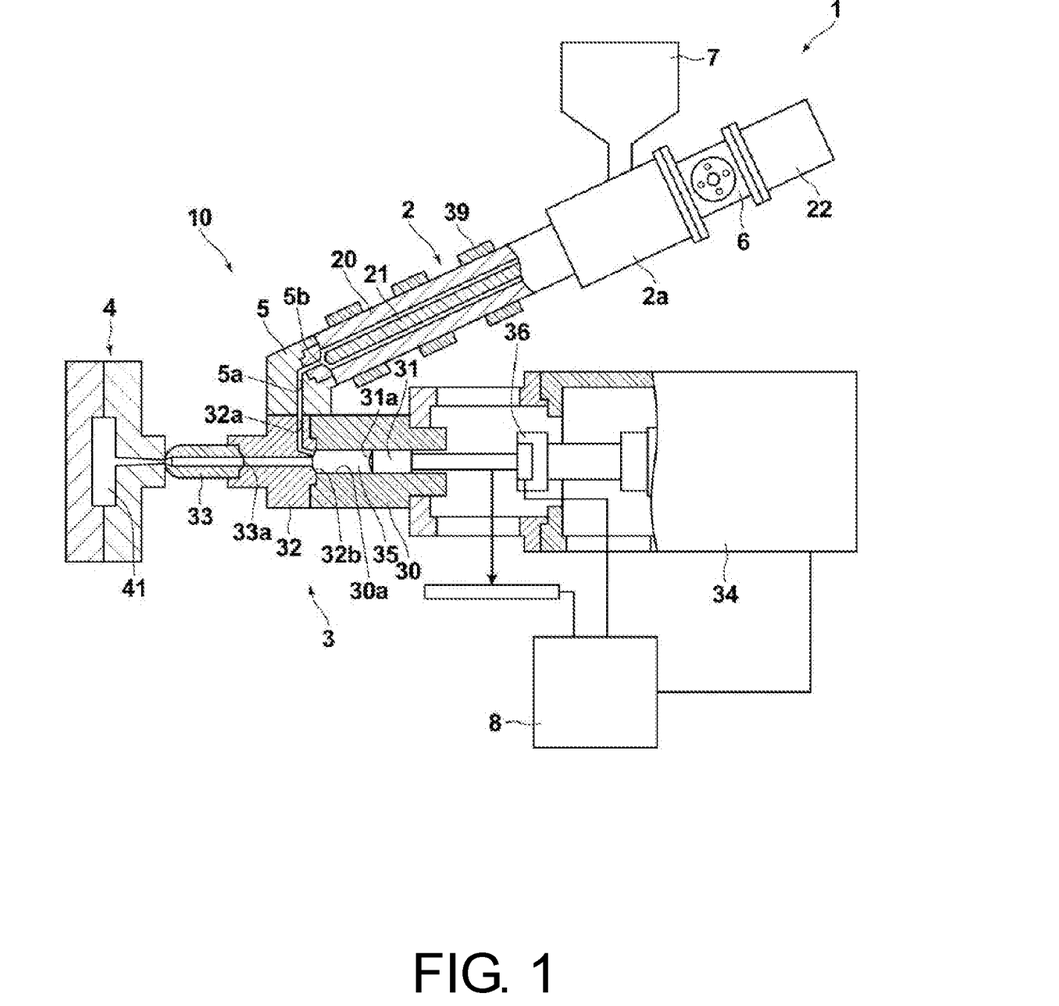
FIG. 1 is a schematic diagram of an injection molding machine according to one embodiment of the present invention.
Figure 2:
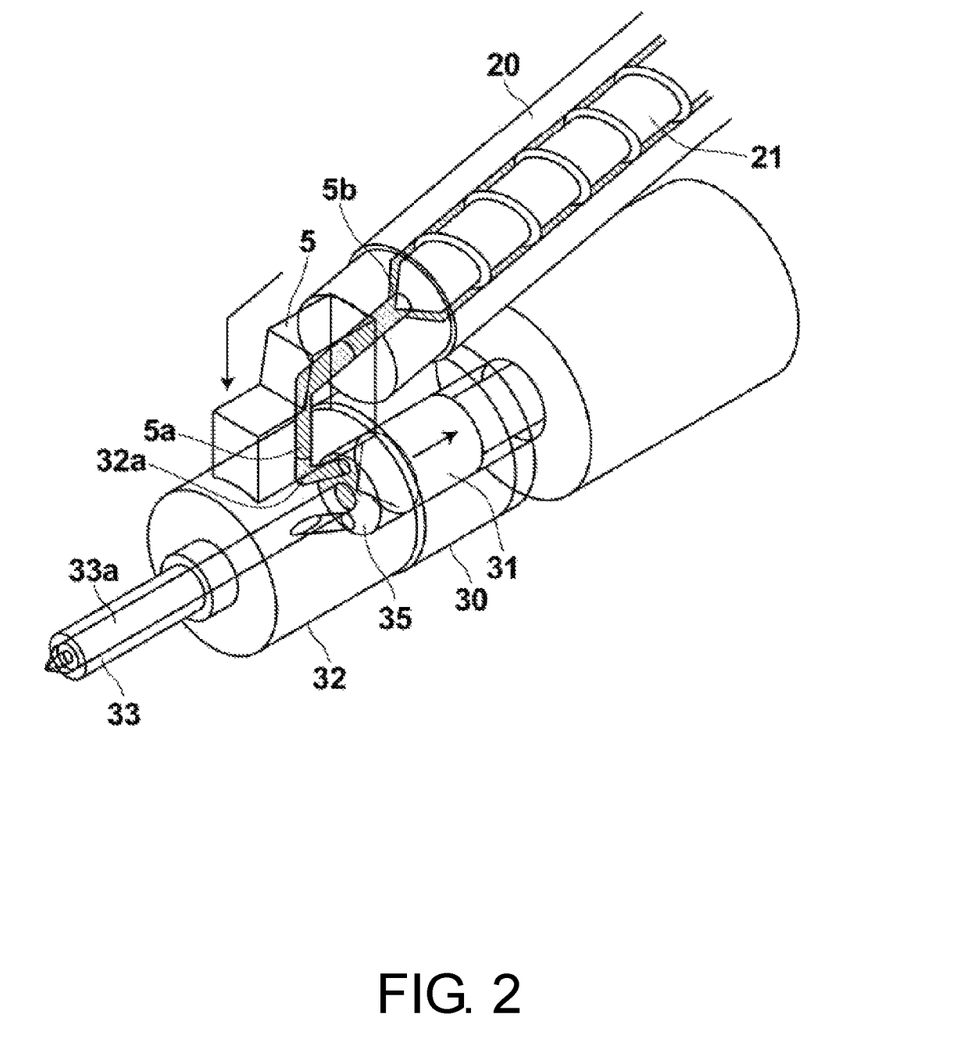
FIG. 2 is a diagram illustrating a metering operation of an injection device.
Figure 3:
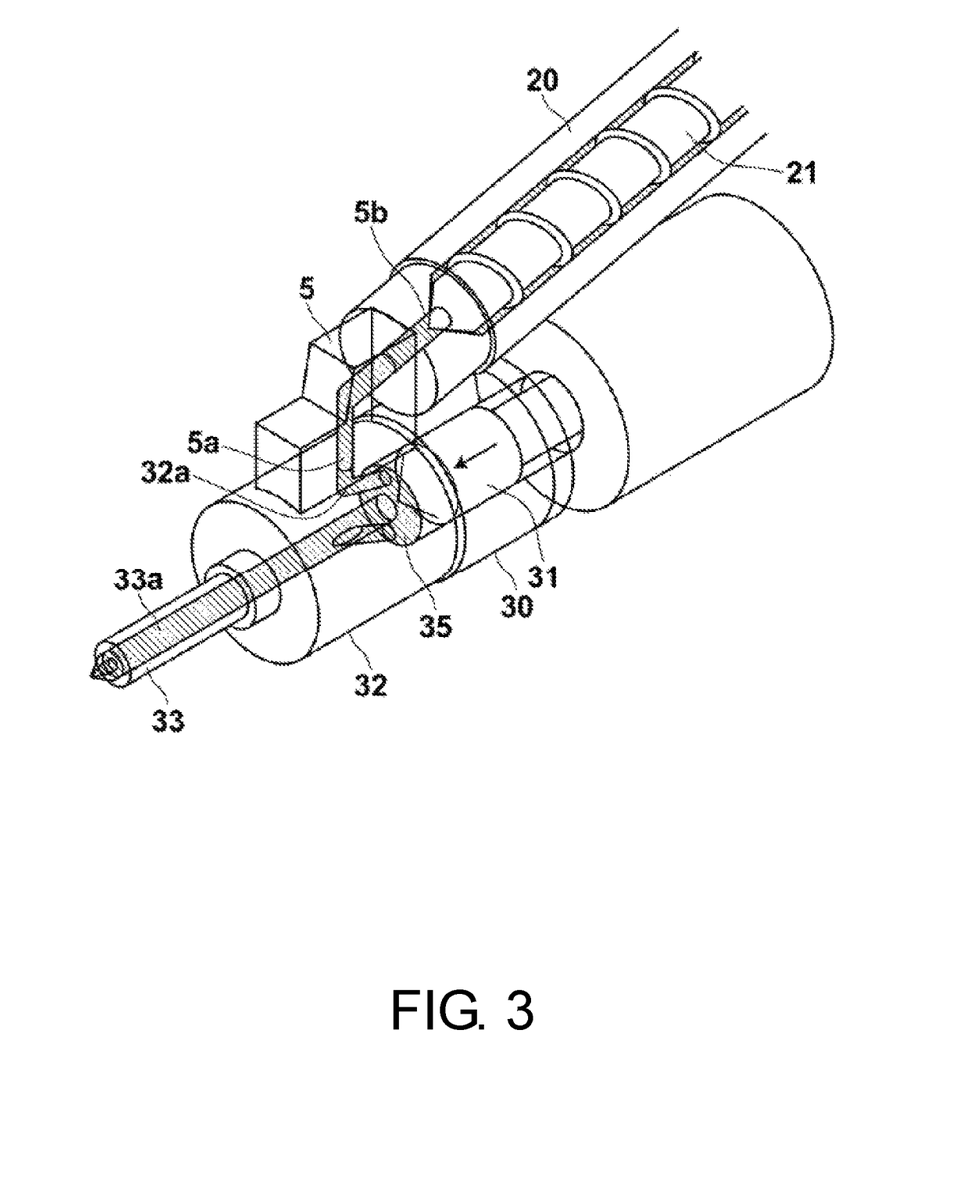
FIG. 3 is a diagram illustrating an injection operation of the injection device.

Embodiments of the present invention will be described with reference to the drawings, taking a case in which a molding material is a thermoplastic resin material as an example. FIG. 1 is a schematic configuration diagram of an injection molding machine 1 according to one embodiment of the present invention, and FIGS. 2 and 3 are diagrams illustrating an operation of an injection device 10. The injection molding machine 1 according to the present invention includes a plasticizing unit 2 which plasticizes a molding material, an injection unit 3 which injects the plasticized molding material supplied from the plasticizing unit 2 into a cavity space 41 of a mold 4, a junction 5 in which a communication path 5a for communicating the plasticizing unit 2 and the injection unit 3 is formed, and a mold clamping device (not illustrated) in which the mold 4 is installed and which opens and closes the mold 4 and clamps the mold 4. Further, the injection device 10 is configured with the plasticizing unit 2, the injection unit 3 and the junction 5. In the injection molding machine 1, the injection device 10 and the mold clamping device are disposed on a machine base (not shown) and driven and controlled by each control portion (not illustrated). Also, in the embodiment, a thermoplastic resin material is used as a molding material. However, for the molding material, a thermoplastic resin, a thermosetting resin, a metal, a composite material thereof, or the like may be used, and it is not particularly limited.

As illustrated in FIG. 1, the plasticizing unit 2 includes a plasticization cylinder 20, a screw 21 located in the plasticization cylinder 20, a rotary driving device 22 which rotates the screw 21, and a backflow prevention mechanism 6 which slightly advances and retreats the screw 21. Further, a hopper 7 is provided to supply a resin material from a rear end side of the plasticization cylinder 20. The hopper 7, the plasticization cylinder 20 and the backflow prevention mechanism 6 are installed at a hopper installation member 2a. The rotary driving device 22 is installed at the backflow prevention mechanism 6, which will be described later. A material discharge port of the hopper 7 and a material supply port of the plasticization cylinder 20 communicate with each other through an inner hole of the hopper installation member 2a. An inside of the plasticization cylinder 20 of the plasticizing unit 2 communicates with an injection chamber 35 of the injection unit 3 through a communication path 5a of the junction 5, and an opening 5b of the communication path 5a on the plasticizing unit side is located on an axis of the screw 21. A tip end of the screw 21 is formed in a sharp conical shape. Further, an internal structure of the plasticizing unit 2 will be described later in detail.

Figure 4:
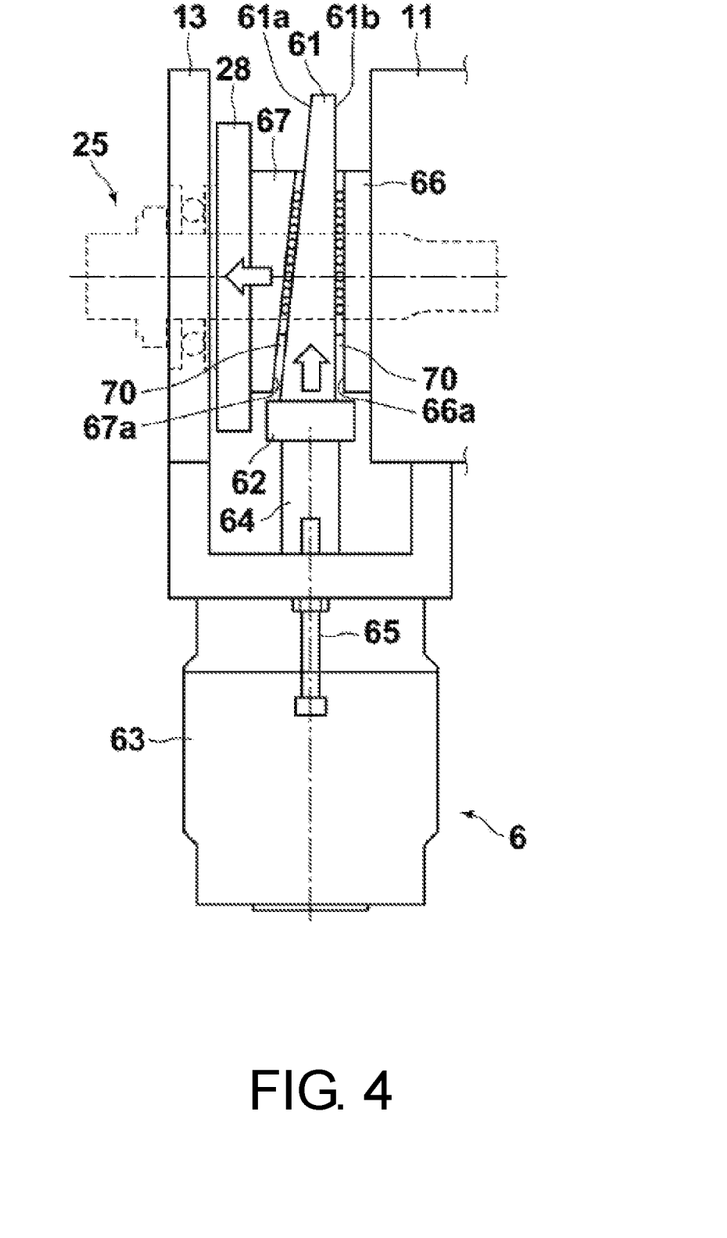
FIG. 4 is a schematic configuration diagram illustrating an operation of a backflow prevention mechanism when a screw advances.
Figure 5:
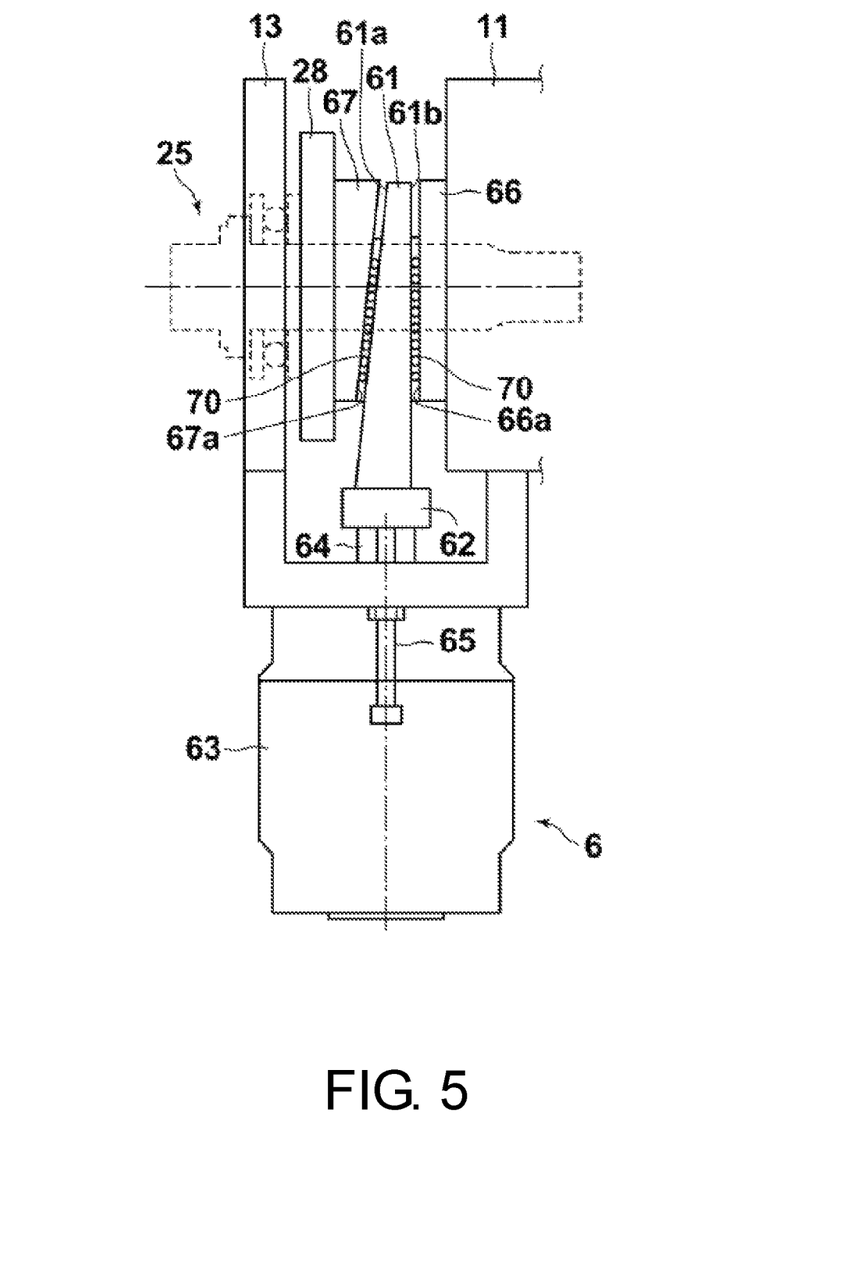
FIG. 5 is a schematic configuration diagram illustrating the operation of the backflow prevention mechanism when the screw retreats.
Figure 6:
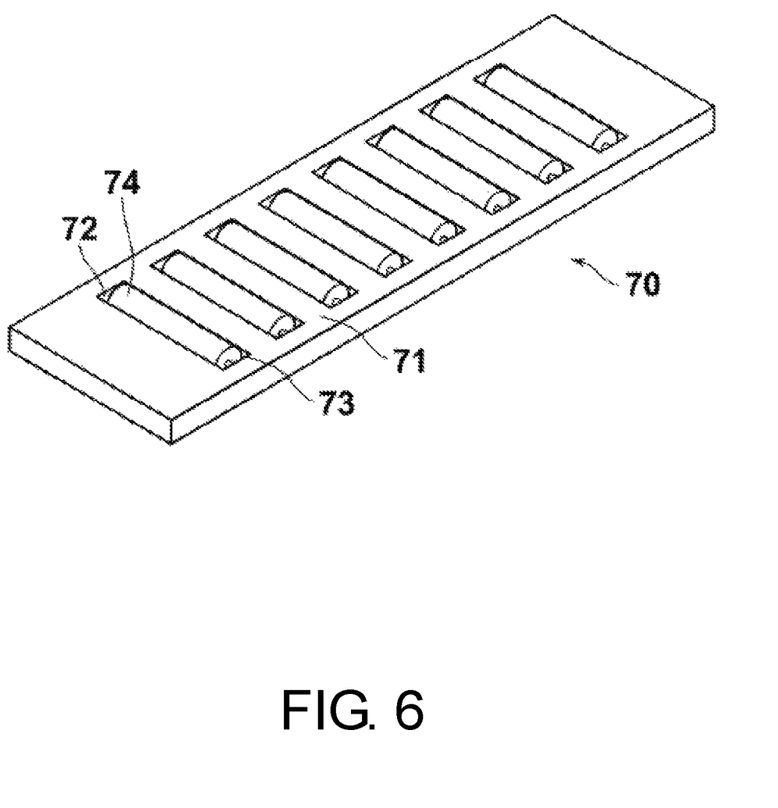
FIG. 6 is a schematic perspective view of a flat roller.
Figure 7:
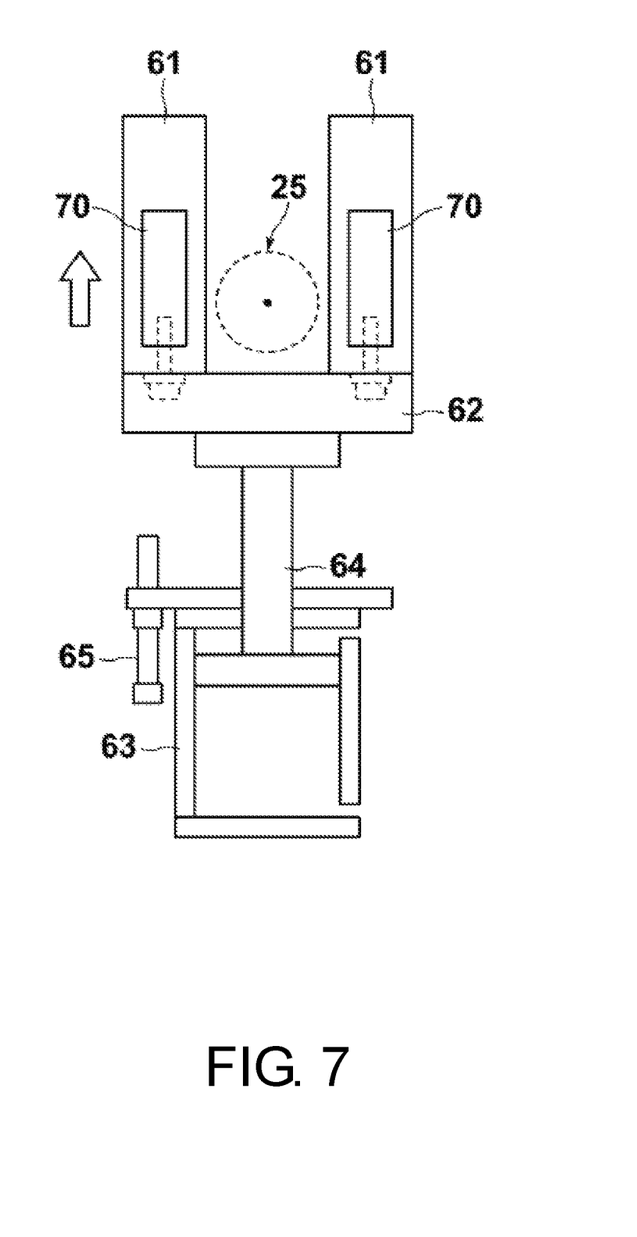
FIG. 7 is a view illustrating an operation of a wedge portion when the screw advances.
Figure 8:
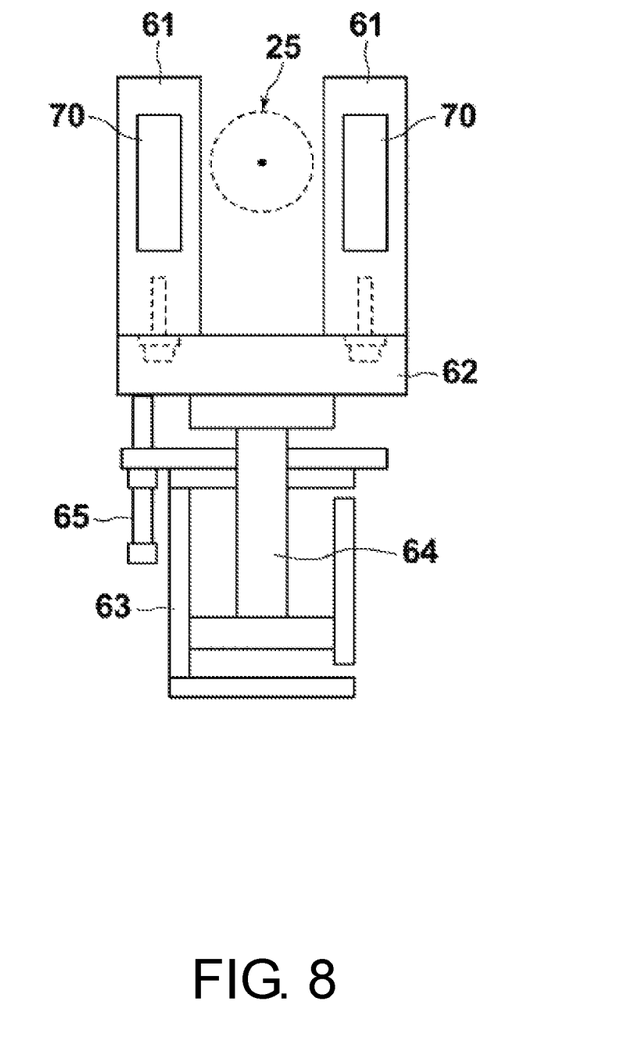
FIG. 8 is a view illustrating the operation of the wedge portion when the screw retreats.

As illustrated in FIGS. 2 and 3, the backflow prevention mechanism 6 opens and closes the opening 5b of the communication path 5a on the plasticizing unit side by advancing and retreating the screw 21 in an axial direction of the screw 21. Here, FIGS. 4 and 5 are schematic configuration views illustrating an operation of the backflow prevention mechanism 6, FIG. 6 is a schematic perspective view of a flat roller 70, and FIGS. 7 and 8 are views illustrating an operation of the wedge portion 61. Hereinafter, in FIGS. 4 and 5, advancing and retreating directions in which the screw 21 in the plasticization cylinder 20 moves, i.e., the axial direction of the screw 21, will be referred to as transverse directions (left and right directions in the drawing), and directions (upward and downward directions in the drawing) in which the wedge portion 61 moves will be referred to as forward and backward directions. Also, the forward and backward directions in FIGS. 4 and 5 correspond to directions between a back side and a front side in FIG. 1. Also, FIG. 7 is a view of the wedge portion 61 of FIG. 4 as seen from a right side in the transverse direction, and FIG. 8 is a view of the wedge portion 61 of FIG. 5 as seen from the right side in the transverse direction.

As illustrated in FIGS. 4 and 5, the backflow prevention mechanism 6 includes the wedge portion 61 which is formed as a tapered quadrangular pillar which is tapered toward a tip end thereof, a pneumatic cylinder 63 which is a driving portion to move the wedge portion 61 in the forward and backward directions, and a pressing member which is pressed by the wedge portion 61 by forward and backward movement of the wedge portion 61 to advance the screw 21 toward the tip end side, that is, to the left. For example, directions in which the wedge portion 61 moves forward and backward are directions perpendicular to the axial direction, as illustrated in FIGS. 4 and 5.

In two surfaces of the wedge portion 61 which face each other in the transverse direction, a left surface thereof is an inclined surface 61a of which a transverse position is changed by the forward and backward movement of the wedge portion 61, and a right surface thereof is a flat surface 61b which is perpendicular to the transverse direction. In the embodiment, the wedge portion 61 is formed so that a taper ratio is 1/10. As illustrated in FIGS. 7 and 8, the backflow prevention mechanism 6 includes two wedge portions 61, the two wedge portions 61 are disposed across an axis of a check shaft 25 which will be described later, that is, the axis of the screw 21, and rear ends of the two wedge portions 61 are screwed and fixed to a connection member 62 which is formed as a rectangular parallelepiped, and thus the two wedge portions 61 are connected to each other. Further, the fixing method is not particularly limited to screwing, and the wedge portions 61 may be fixed with an adhesive or the like, or other well-known fixing methods may be used. In the embodiment, the transverse direction of the wedge portion 16 coincides with the axis of the check shaft 25, that is, the axis of the screw 21.

The pneumatic cylinder 63 is a single acting cylinder, a piston rod 64 moves forward to protrude from the cylinder 63 when compressed air is supplied to a working chamber on a piston head side, and the piston rod 64 moves backward to retract into the cylinder 63 when a pressure acting on the screw 21 from a molten resin is applied to the screw 21, which rotates while opening the working chamber on the piston head side to atmospheric pressure, which will be described later, via the wedge portion 61. The supply of the compressed air and the releasing to the atmospheric pressure may be switched by an electromagnetic switching valve which is not illustrated. Since the opening of the pneumatic cylinder 63 to the atmospheric pressure need only communicate an inside of the working chamber on the piston head side with an outside of the pneumatic cylinder 63, a supply/ discharge port of the working chamber on the piston head side may be opened by simply communicating with the outside of the pneumatic cylinder 63 through a muffler.

The pneumatic cylinder 63 is connected to an air compressor which is not illustrated, and the compressed air is supplied and discharged by the air compressor. The compressed air supplied and discharged from the air compressor may be supplied to and discharged from the working chamber of the pneumatic cylinder 63 on the piston head side through a pressure reducing valve and an air filter which are not illustrated. Further, the pneumatic cylinder 63 may be a double acting cylinder. The pneumatic cylinder 63 with a well-known configuration can be used, and a detailed description thereof will be omitted. In the embodiment, since the connection member 62 is fixed to the tip end of the piston rod 64 by screwing or the like, the wedge portion 61 is moved forward and backward together with the connecting member 62 when the piston rod 64 moves forward and backward by driving of the pneumatic cylinder 63.

Here, since the taper ratio of the wedge portion 61 is 1/10, a thrust force when the pneumatic cylinder 63 and the wedge portion 61 are combined is ten times a thrust force of the pneumatic cylinder 63. Also, a structure for advancing the screw 21 by the thrust force will be described later. Although the taper ratio of the wedge portion 61 is 1/10 in the embodiment, the present invention is not limited thereto. When the thrust force in the case in which the pneumatic cylinder 63 and the wedge portion 61 are combined becomes larger than the thrust force required for advancing the screw 21, the taper ratio or the specification of the pneumatic cylinder can be appropriately changed.

The backflow prevention mechanism 6 may have a stroke adjustment means for stopping the backward movement of the wedge portion 61 at a predetermined position, so as to adjust the distance at which the screw 21 separates from the opening 5b on the plasticizing unit side. For example, the backflow prevention mechanism 6 has a stroke adjustment screw 65 for adjusting a stroke of the wedge portion 61 at a position facing a rear end surface of the connection member 62, and rearward movement of the wedge portion 61 is stopped by the connection member 62 being in contact with a front end surface of the stroke adjustment screw 65, as illustrated in FIG. 5. Also, in the embodiment, although the stroke adjustment screw 65 is installed on a member (not illustrated) for installing the pneumatic cylinder 63, the present invention is not limited thereto, and it may be installed in any member as long as it can be in contact with the connection member 62. Further in the embodiment, although the stroke adjustment screw 65 is provided to adjust the stroke of the wedge portion 61, the present invention is not limited thereto and may have a stroke adjusting means according to another configuration as long as the stroke of the wedge portion 61 can be adjusted. Even if the force for adjusting the backward movement of the screw 21 is small, the stroke adjustment means can sufficiently stop the backward movement of the screw 21 at the predetermined position by the boosting action of the wedge portion 61, so it is very easy to adjust the stroke. In addition to this, the device can be made compact.

As illustrated in FIGS. 4 and 5, the backflow prevention mechanism 6 also has a barrier wall member 66 having a flat surface 66a at a position facing the flat surface 61b of the wedge portion 61, and the barrier wall member 66 is fixed to and installed on a cylindrical member 11 which will be described later. Further, a first pressing member 67 having an inclined surface 67a of the same angle is provided at a position facing the inclined surface 61a of the wedge portion 61, and the first pressing member 67 is fixed to a second pressing member 28 which will be described later. The flat roller 70 is interposed between the flat surface 61b of the wedge portion 61 and the flat surface 66a of the barrier wall member 66 and between the inclined surface 61a of the wedge portion 61 and the inclined surface 67a of the first pressing member 67 so that the wedge portion 61 can smoothly move forward and backward.

As illustrated in FIG. 6, the flat roller 70 includes a plate member 71 formed of a rectangular plate, a plurality (eight in the embodiment) of rectangular openings 72 formed in the plate member 71, a shaft 73 having an axis arranged in a lengthwise direction of the opening 72, and a roller 74 in which the shaft 73 is inserted, and a surface of the roller 74 is disposed to be in contact with each of the flat surfaces 61b and 66a and the inclined surfaces 61a and 67a. The flat roller 70 is grasped by a force which allows the flat roller 70 to be kept at least between the flat surface 61b and the flat surface 66a and between the inclined surface 61a and the inclined surface 67a while allowing the wedge portion 61 to move forward and backward. Also, although the flat roller 70 has eight rollers 74 in the embodiment, the present invention is not limited to this, and the number of rollers may be seven, nine, or may be changed as appropriate. Further, although the roller 74 is elongated, it may be, for example, a spherical roller or the like. Furthermore, in the embodiment, the flat roller 70 is provided, but the present invention is not limited thereto, and various means can be adopted as long as the wedge portion 61 can smoothly move forward and backward.

Figure 9:
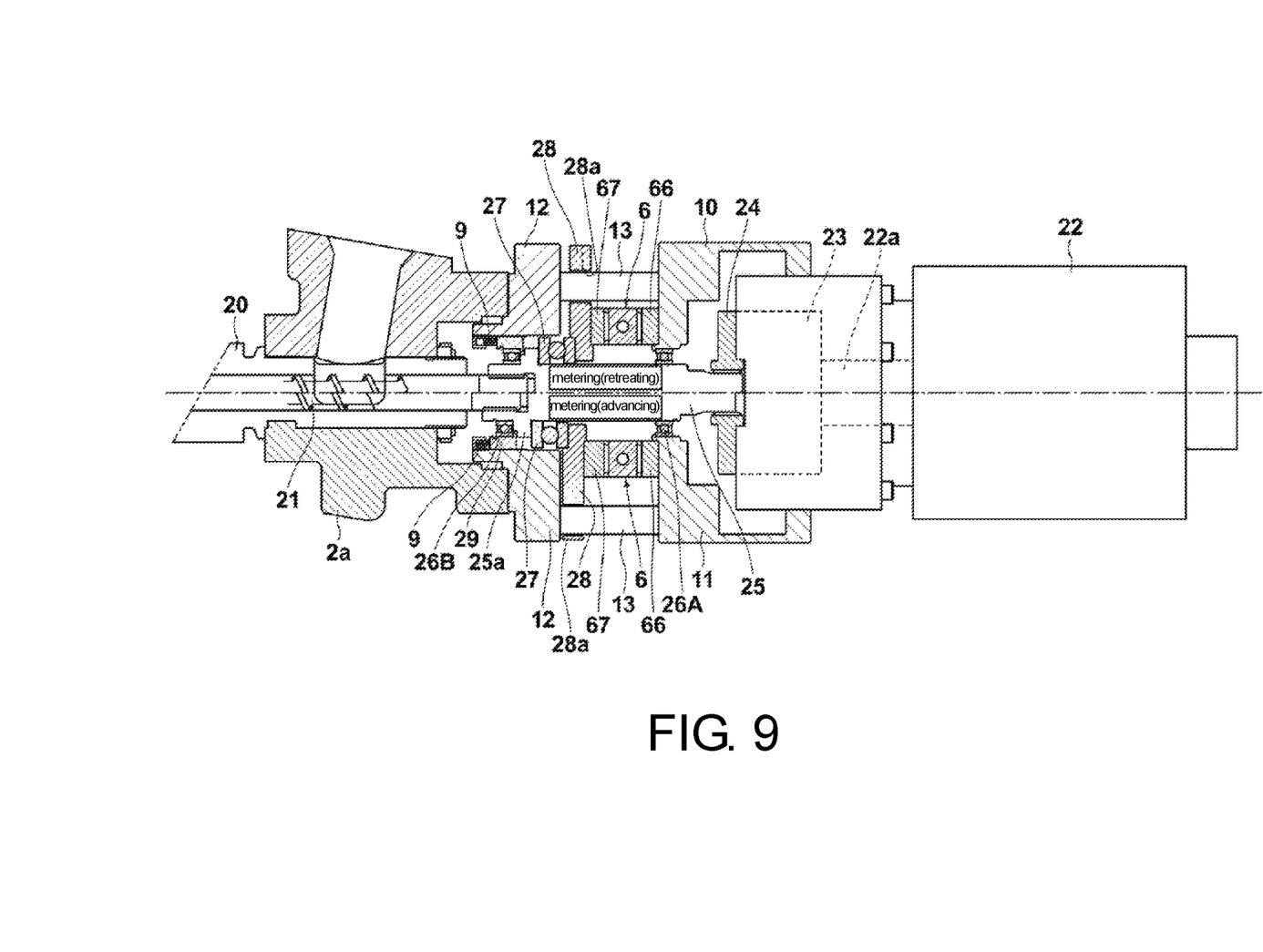
FIG. 9 is a cross-sectional view of a main portion of a plasticizing unit.

Here, an internal structure of the plasticizing unit 2 will be described. FIG. 9 is a cross-sectional view of a main portion of the plasticizing unit. Further, directions between a back side and a front side in FIG. 9 correspond to the forward and backward directions of the wedge portion 61 in FIGS. 4 and 5. In FIG. 9, a direction (left in the drawing) in which the screw 21 advances will be described as a tip end side. The plasticizing unit 2 includes a rotating member 23 connected to a rotary shaft 22a of a rotary driving device 22 and rotated in accordance with driving of the rotary driving device 22, a disc member 24 connected to the rotating member 23 and rotating together with the rotating member 23, and a check shaft 25 of which a rear end is connected to the disc member 24 and a tip end is connected to the screw 21. The check shaft 25 has a flange portion 25a protruding outward toward the tip end side from a center in the lengthwise direction. The rotary driving device 22 is appropriately configured as a pneumatic type or an electric type.

A tooth-shaped groove is machined on an inner circumferential surface of the disc member 24, and a convex line which is engaged with the groove is machined on an outer circumferential surface of a rear end of the check shaft 25, and rotation axes thereof are joined by spline coupling. Further, a cylindrical hole is provided at a tip end of the check shaft 25, and a tooth-shaped groove is machined on an inner circumferential surface of the hole, and a convex line which is engaged with the groove is machined on an outer circumferential surface of the rear end of the screw 21, and rotation axes thereof are joined by spline coupling in the same manner as described above. In addition, the fixation of the check shaft 25 and the screw 21 are not limited to the spline coupling but may be fixed by a well-known technique such as screw fixing or fixing using an adhesive.

Further, the plasticizing unit 2 includes the cylindrical member 11 which rotatably accommodates a tip end side of the rotating member 23, a cylindrical accommodation member 12 which accommodates a tip end side of the check shaft 25, and a guide shaft 13 which is connected to the cylindrical member 11 and the accommodation member 12 and through which the second pressing member 28 pressed on the first pressing member 67 is inserted. The check shaft 25 is held through an opening of the cylindrical member 11 on the tip end side via a first bearing 26A (hereinafter referred to as a bearing 26A). A second bearing 26B (hereinafter referred to as a bearing 26B) is disposed on an outer circumferential surface of the check shaft 25 on the tip end side in relation to the flange portion 25a. A cylindrical holding member 29 is fixed to an outer circumferential surface of the bearing 26B and is held by the accommodation member 12 to be movable forward and backward. One end of each of a plurality of springs 9 is in contact with an end surface of the holding member 29 on the screw 21 side, the other end thereof is in contact with the accommodation member 12, and the plurality of springs 9 are disposed on the end surface at regular intervals. The accommodation member 12 is held by the hopper installation member 2a to which the plasticization cylinder 20 is fixed.

The spring 9 is configured with a compression coil spring. In a state in which the screw 21 is advanced, that is, in a state in which the opening 5b of the communication path 5a on the plasticizing unit side is closed, the spring 9 is compressed by the holding member 29 pressed against the flange portion 25a of the check shaft 25, thereby biasing the screw 21 in a retreating direction. Further, although the number of springs 9 is, for example, four or eight in the embodiment, the present invention is not limited thereto. As long as the check shaft 25 can be straightly pressed in a direction of the rotation axis, the number of springs 9 may be one and may also be changed as appropriate. For example, one spring 9 having an inner diameter dimension in which the bearing 26B is inserted may be provided. Also, the spring 9 is not limited to the compression coil spring, and any spring mechanism may be used as long as the screw 21 can be biased in the retreating direction.

A third bearing 27 (hereinafter referred to as a bearing 27) is fixed between a rear end surface of the flange portion 25a of the check shaft 25 and a front end surface of the second pressing member 28, and an insertion hole 28a through which the guide shaft 13 is inserted is provided in the second pressing member 28. The second pressing member 28 moves forward and backward along the guide shaft 13 when being pressed by the first pressing member 67, as illustrated in FIG. 9.

Next, a rotating operation of the screw 21 of the plasticizing unit 2 will be described. As illustrated in FIG. 9, when the rotary driving device 22 is driven, the rotating member 23 and the disc member 24 rotate as the rotary driving device 22 rotates, and the check shaft 25 spline-coupled to the disc member 24 also rotates. With such rotation, inner rings of the bearings 26A and 26B rotate, and a shaft raceway plate (ring portion on the left side in FIG. 9) fixed to the flange portion 25a of the bearing 27 also rotates. Additionally, as the check shaft 25 rotates, the screw 21 spline-coupled to the check shaft 25 also rotates. In this way, the screw 21 rotates.

Next, forward movement of the screw 21 of the plasticizing unit 2 by the backflow prevention mechanism 6 will be described. In the embodiment, as illustrated in FIG. 3, the backflow prevention mechanism 6 advances the screw 21 from a state in which the screw 21 is retracted as illustrated in FIG. 2, that is, a state in which the opening 5b of the communication path 5a on the plasticizing unit side is open, and thus the opening 5b of the communication path 5a on the plasticizing unit side is closed by the tip end of the screw 21. In order to advance the screw 21, the pneumatic cylinder 63 is first driven to move the wedge portion 61 from a retreated state illustrated in FIG. 5 to an advanced state illustrated in FIG. 4. Further, when the screw 21 advances, the driving of the rotary driving device 22 is stopped.

When the compressed air is supplied to the working chamber of the pneumatic cylinder 63 on the piston head side, the connection member 62 and the two wedge portions 61 move forward (upward in FIG. 4) together with the piston rod 64, as illustrated in FIG. 4. When the wedge portions 61 move forward, a position of the inclined surface 61a in the transverse direction moves to the tip end side of the check shaft 25, that is, to the left side in the drawing, and thus the inclined surface 67a of the first pressing member 67 is pressed and moved toward the tip end side via the flat roller 70.

When the first pressing member 67 moves to the tip end side, as illustrated in FIG. 9, the second pressing member 28 moves to the tip side along the guide shaft 13, and the bearing 27 fixed to the second pressing member 28 also moves to the tip end side. When the bearing 27 moves to the tip end side, the check shaft 25 of which the flange portion 25a is fixed to the bearing 27 also moves to the tip end side, and the screw 21 coupled to the check shaft 25 also advances toward the tip end side. Also, when the check shaft 25 moves to the tip end side, the holding member 29 also moves to the tip end side together with the bearing 26B, and the spring 9 is compressed by the holding member 29. In the embodiment, the pressing member is configured with the first pressing member 67, the second pressing member 28, the bearing 27 and the check shaft 25.

In this manner, the screw 21 advances due to the thrust force generated by the pneumatic cylinder 63 and the wedge portion 61. The compressed air is continuously supplied to the pneumatic cylinder 63, and thus, due to the thrust force generated by the pneumatic cylinder 63 and the wedge portion 61, the screw 21 which closes the opening 5b of the communication path 5a on the plasticizing unit side maintains the closed state of the communication path 5a against a large resin pressure of the molten resin which flows back in an injection process and prevents the backflow. Further, in order to return the wedge portion 61 from an advanced state of FIG. 4 to a retreated state of FIG. 5, the driving of the rotary driving device 22 starts in a state in which the driving of the pneumatic cylinder 63 is stopped, that is, in a state in which the supply of the compressed air to the working chamber of the pneumatic cylinder 63 on the piston head side is stopped and the working chamber on the piston head side is opened. The screw 21 is rotated by the rotary driving device 22. By the rotation of the screw 21, the molten resin in the plasticization cylinder 20 is extruded into the injection chamber 35 through the communication paths 5a and 32a. When the molten resin is extruded from the plasticization cylinder 20, the screw 21 in the plasticization cylinder 20 is retreated by the molten resin of which a pressure is increased in the plasticization cylinder 20.

At this time, since the pneumatic cylinder 63 is stopped, the thrust force generated by the pneumatic cylinder 63 and the wedge portion 61 does not act on the screw 21 and the pressing member. Therefore, as illustrated in FIG. 9, since the flange portion 25a presses the bearing 27 in the retreating direction (the right side in the drawing) as the screw 21 retreats, the bearing 27, the second pressing member 28 and the first pressing member 67 move in the retreating direction, and the first pressing member 67 presses the wedge portion 61, and thus the wedge portion 61 moves backward from the advanced state of FIG. 4 and returns to the retreated state of FIG. 5.

Further, in the embodiment, as illustrated in FIG. 9, since the screw 21 is compressed to bias the screw 21 in the retreating direction in a state in which the screw 21 is advanced, when the pneumatic cylinder 63 stops and the thrust force generated by the pneumatic cylinder 63 and the wedge portion 61 no longer acts on the pressing member, the thrust force is not applied to the holding member 29, and thus a force for returning from a compressed state to an original shape is generated in the spring 9. By this force, the screw 21 is pressed in the retreating direction through the holding member 29, the bearing 26B and the check shaft 25, and the spring 9 assists with the movement of the screw 21 in the retreating direction. The screw 21 can be reliably retreated by the assist action of the spring 9.

The injection unit 3 includes the injection cylinder 30, a plunger 31 in the injection cylinder hole 30a of the injection cylinder 30, an injection driving device 34 for moving the plunger 31 forward and backward, and an injection nozzle 33 installed at a front end of the injection cylinder 30 via a nozzle cylinder 32. A front wall 32b having approximately the same shape as a tip end surface 31a of the plunger 31 is formed on an end surface of the nozzle cylinder 32 on the injection cylinder 30 side. The injection chamber 35 is formed as a space surrounded by the front wall 32b, the injection cylinder hole 30a of the injection cylinder 30 and the tip end surface 31a of the plunger 31. The injection chamber 35 has a communication path 32a communicating with the interior of the plasticization cylinder 20 via the communication passage 5a of the junction 5 and an injection hole 33a communicating with a tip end of the injection nozzle 33. A coupling 36 connects the plunger 31 with a driving rod of the injection driving device 34.

Although the various driving devices of the injection unit 3 are configured as an electric type, the present invention is not limited thereto and may be appropriately configured by a pneumatic type or the like. A heating device 39 (hereinafter, simply referred to as a heater) such as a band heater is provided on outer circumferences of the plasticization cylinder 20, the injection cylinder 30, the nozzle cylinder 32, the junction 5, the injection nozzle 33, and so on. For example, each cylinder is divided into a plurality of zones in the axial direction, such as a tip portion, an intermediate portion and a rear end portion, and the heater 39 is wound around each of them. Further, the heater 39 is also wound on the injection nozzle 33. FIG. 1 illustrates a state in which the heater 39 is wound around the plasticization cylinder 20 for convenience, but it is also wound around the injection cylinder 30, the nozzle cylinder 32, the junction 5 and the injection nozzle 33.

The mold clamping device has a mechanism for opening and closing the mold 4 and has a structure in which a sufficient pressure (mold clamping force) is applied when the mold 4 is filled with a resin material. When a mold clamping force is applied, the melted resin material is not overpowered by a pressure when entering the mold 4, and thus the resin material does not leak from the mold 4.

Next, a series of operations by the injection molding machine 1 will be described. As illustrated in FIGS. 1 and 2, the resin material supplied from the hopper 7 is extruded toward an inside of the injection chamber 35 through the communication paths 5a and 32a by the rotation of the screw 21 while being plasticized and melted by the shear heat generated by the rotation of the screw 21 and the heating by the heater 39. While the molten resin receives a predetermined back pressure by retreating the plunger 61, the molten resin is metered according to a retreated distance of the plunger 61. At this time, as described above, the backflow prevention mechanism 6 allows the screw 21 to be retreated by the pressure acting on the extruded molten resin and opens the opening 5b of the communication path 5a on the plasticization cylinder 50 side. Next, when the plunger 31 comes to a position of an injection stroke, that is, when the metering is completed, the rotation of the screw 21 is stopped, and the backflow prevention mechanism 6 drives the pneumatic cylinder 63 to advance the wedge portion 61 as described above, the inclined surface 61a presses the pressing member, and the screw 21 is advanced toward the tip end side by the pressing member to close the opening 5b of the communication passage 5a on the plasticization cylinder side, thereby preventing the backflow. In this state, as illustrated in FIG. 5, the plunger 31 is advanced so that the molten resin in the injection cylinder 30 is injected from the injection nozzle 33 toward the cavity space 41 in the mold 4 to be filled. After the molten resin filled in the cavity space 41 is cooled, the mold 4 is opened by the mold clamping device and the cooled molded product is removed. The molded product is formed by the injection molding machine 1 as described above.

According to the injection molding machine 1 of the embodiment, the backflow prevention mechanism 6 includes: the tapered wedge portion 61 having the inclined surface 61a of which the position in the transverse direction is changed by the movement in the forward and backward directions, that is, the inclined surface 61a which is oblique to the forward and backward movement directions and oblique to the transverse direction; the pneumatic cylinder 63 for moving the wedge portion 61 in the forward and backward directions; and the pressing member which is disposed to face the inclined surface 61a of the wedge portion 61 and is moved while being pressed on the inclined surface 61a by the forward movement of the wedge portion 61 and moves the screw 21 toward the tip end side, that is, toward the opening 5b of the communication path 5a on the plasticization cylinder side, the screw 21 is moved forward by the wedge portion 61 Thus, even when the pneumatic cylinder 63 having a small output is a driving portion, the sufficient thrust force which can prevent the backflow of the molding material by a boosting action of the wedge portion 61 can be generated, and it is possible to prevent an increase in size of the driving device. Also, by not adopting the hydraulic type, maintenance becomes easy.

In the present embodiment, although the pneumatic cylinder 63 is used as a driving portion for moving the wedge portion 61 forward and backward in the backflow prevention mechanism 6, the present invention is not limited thereto, and an electric actuator may be used. Even if the driving portion is an electric actuator, since the screw 21 is moved forward by the wedge part 61, sufficient thrust force to prevent the backflow of the molding material by the boosting action of the wedge portion 61 can be generated even if the output of the electric actuator is small, and thus it is possible to prevent the increase in size of the driving device. Also, by not adopting the hydraulic type, the maintenance becomes easy.

Also, a hydraulic cylinder may be used as the driving portion. In the case in which the hydraulic cylinder is used, even if the hydraulic cylinder with a small output is used for the driving portion, since the screw 21 is moved forward by the wedge portion 61, it is possible to generate sufficient thrust to prevent the backflow of the molding material by the boosting action of the wedge portion 61, and thus it is possible to prevent the increase in size of the driving device.

Further, in the embodiment, the rotary driving device 22 and the injection driving device 34 are of the electric type or the pneumatic type, but a hydraulic type may also be used.

The injection molding machine of the present invention can be applied to an injection molding machine in which a mixing unit (not illustrated) is provided and a liquid thermosetting resin material and a curing agent supplied using a liquid feed pump into a mixing cylinder is extruded toward the injection chamber 35 of the injection unit 3 through the communication paths 5a and 32a by the rotation of the screw while being mixed by the screw (not illustrated) rotating in the mixing cylinder. Since the screw of the mixing unit can also feed the liquid resin material in the mixing cylinder to the injection chamber 35 of the injection unit 3 using the liquid feeding pump, a screw which has only protrusions for mixing the resin material on a rotating surface of the screw and cannot send the resin material mixed by rotation to the tip end side of the screw may also be used.

The embodiment was chosen in order to explain the principles of the invention and its practical application. Many modifications and variations are possible in light of the above teachings. It is intended that the scope of the invention be defined by the claims.

What is claimed is:

1. An injection molding machine comprising:
    a plasticizing unit configured to plasticize a molding material by rotation of a screw in a plasticization cylinder,
    an injection unit configured to meter the plasticized molding material supplied from the plasticizing unit by retreating a plunger in an injection cylinder and then to inject the plasticized molding material by advancing the plunger,
    a communication path configured to communicate the plasticization cylinder of the plasticizing unit and the injection cylinder of the injection unit and having an opening on a plasticizing unit side which opens into the plasticization cylinder and is located on an axis of the screw, and
    a backflow prevention mechanism configured to open and close the opening on the plasticizing unit side by advancing and retreating the screw in an axial direction of the screw in the plasticization cylinder,
    wherein the backflow prevention mechanism comprises a tapered wedge portion which is movable in forward and backward directions, is tapered toward a tip end thereof and has an inclined surface oblique to the forward and backward directions and oblique to the axial direction of the screw,
    a driving portion configured to move the wedge portion forward,
    a pressing member which is disposed to face the inclined surface of the wedge portion and is moved while being pressed against the inclined surface by forward movement of the wedge portion and moves the screw toward the opening on the plasticizing unit side,
    a stroke adjusting means for stopping the backward movement of the wedge portion at a predetermined position by a contact, so as to adjust a distance at which the screw separates from the opening on the plasticizing unit side by adjusting the predetermined position,
    wherein the plasticizing unit comprises a rotary driving device which rotates the screw,
    wherein the screw is connected to be able to advance and retreat in the axial direction of the screw with respect to a rotary shaft of the rotary driving device and to transmit rotation of the rotary shaft,
    wherein the screw is advanced by a thrust force generated by the driving portion and the wedge portion after rotation of the rotary driving device is stopped, and
    wherein, while the rotary driving device starts to rotate after the driving portion is stopped, the screw is retreated by pressure acting on the plasticized molding material extruded toward the injection cylinder through the communication path from the plasticization cylinder.

2. The injection molding machine according to claim 1, wherein the forward and backward directions of the wedge portion are directions perpendicular to the axial direction of the screw.

3. The injection molding machine according to claim 1, wherein one of two surfaces of the wedge portion which face each other in the axial direction of the screw is the inclined surface, and the other one is a flat surface perpendicular to the axial direction of the screw.

4. The injection molding machine according to claim 1, wherein two wedge portions are provided, and the two wedge portions are disposed with the axis of the screw interposed therebetween, and a connection member to which ends of the two wedge portions are connected is provided.

5. The injection molding machine according to claim 1, wherein the driving portion is a pneumatic cylinder or an electric actuator.

6. The injection molding machine according to claim 1, wherein the backflow prevention mechanism has a spring mechanism which biases the screw in a retreating direction in a state in which the screw is advanced.

7. An injection molding machine comprising:
    a mixing unit configured to mix a molding material by rotation of a screw in a mixing cylinder,
    an injection unit configured to meter the mixed molding material supplied from the mixing unit by retreating a plunger in an injection cylinder and then to inject the plasticized molding material by advancing the plunger,
    a communication path configured to communicate the mixing cylinder of the mixing unit and the injection cylinder of the injection unit and having an opening on a mixing unit side which opens into the mixing cylinder and is located on an axis of the screw, and
    a backflow prevention mechanism configured to open and close the opening on the mixing unit side by advancing and retreating the screw in an axial direction of the screw in the mixing cylinder,
    wherein the backflow prevention mechanism comprises a tapered wedge portion which is movable in forward and backward directions, is tapered toward a tip end thereof and has an inclined surface oblique to the forward and backward directions and oblique to the axial direction of the screw,
    a driving portion configured to move the wedge portion forward,
    a pressing member which is disposed to face the inclined surface of the wedge portion and is moved while being pressed against the inclined surface by forward movement of the wedge portion and moves the screw toward the opening on the mixing unit side, and
    a stroke adjusting means for stopping the backward movement of the wedge portion at a predetermined position by a contact, so as to adjust a distance at which the screw separates from the opening on the plasticizing unit side by adjusting the predetermined position,
    wherein the plasticizing unit comprises a rotary driving device which rotates the screw, wherein the screw is connected to be able to advance and retreat in the axial direction of the screw with respect to a rotary shaft of the rotary driving device and to transmit rotation of the rotary shaft, wherein the screw is advanced by a thrust force generated by the driving portion and the wedge portion after rotation of the rotary driving device is stopped, and wherein, while the rotary driving device starts to rotate after the driving portion is stopped, the screw is retreated by pressure acting on the plasticized molding material extruded toward the injection cylinder through the communication path from the plasticization cylinder.

8. The injection molding machine according to claim 7, wherein the forward and backward directions of the wedge portion are directions perpendicular to the axial direction of the screw.

9. The injection molding machine according to claim 7, wherein one of two surfaces of the wedge portion which face each other in the axial direction of the screw is the inclined surface, and the other one is a flat surface perpendicular to the axial direction of the screw.

10. The injection molding machine according to claim 7, wherein two wedge portions are provided, and the two wedge portions are disposed with the axis of the screw interposed therebetween, and a connection member to which ends of the two wedge portions are connected is provided.

11. The injection molding machine according to claim 7, wherein the driving portion is a pneumatic cylinder or an electric actuator.

12. The injection molding machine according to claim 7, wherein the backflow prevention mechanism has a spring mechanism which biases the screw in a retreating direction in a state in which the screw is advanced.

13. The injection molding machine according to claim 10, wherein the stroke adjustment means has a stroke adjustment screw for adjusting a stroke of the wedge portion at a position facing a rear end surface of the connection member, wherein the stroke adjustment screw stops a rearward movement of the wedge portion by the connection member being in contact with a front end surface of the stroke adjustment screw.

14. The injection molding machine according to claim 4, wherein the stroke adjustment means has a stroke adjustment screw for adjusting a stroke of the wedge portion at a position facing a rear end surface of the connection member, wherein the stroke adjustment screw stops a rearward movement of the wedge portion by the connection member being in contact with a front end surface of the stroke adjustment screw.

* * * * *